United States Patent [19]

Mori

[11] 4,308,153
[45] Dec. 29, 1981

[54] COMPOSITE BEARING MATERIAL WITH METALLIC BACKING

[75] Inventor: Sanae Mori, Nagoya, Japan

[73] Assignee: Daido Metal Company Ltd., Japan

[21] Appl. No.: 79,029

[22] Filed: Sep. 26, 1979

Related U.S. Application Data

[63] Continuation of Ser. No. 876,809, Feb. 10, 1978, abandoned.

[30] Foreign Application Priority Data

Mar. 15, 1977 [JP] Japan ................................. 52-28450

[51] Int. Cl.³ ........................ C10M 5/08; F16D 69/02
[52] U.S. Cl. .................................... 252/12.2; 252/12.6;
308/5 R; 308/78; 308/240; 308/DIG. 8;
428/545; 428/626
[58] Field of Search .......... 308/240, DIG. 5, DIG. 8,
308/78, 5 R; 428/613, 626, 624, 550–556, 545;
252/12.2–12.6

[56] References Cited

U.S. PATENT DOCUMENTS

| | | | |
|---|---|---|---|
| 2,946,094 | 7/1960 | Kawasaki | 308/DIG. 8 |
| 3,206,264 | 9/1965 | Dalzell et al. | 308/DIG. 8 |
| 3,300,257 | 1/1967 | Selker et al. | 308/240 |
| 3,380,843 | 4/1968 | Davis | 308/240 |
| 3,677,879 | 7/1972 | D'Andrea | 308/DIG. 8 |
| 3,852,203 | 12/1974 | Morisaki | 252/12 |

FOREIGN PATENT DOCUMENTS

| | | | |
|---|---|---|---|
| 47-29395 | 8/1972 | Japan . | |
| 49-44597 | 11/1974 | Japan . | |
| 50-38748 | 9/1975 | Japan . | |
| 1321983 | 7/1973 | United Kingdom | 308/240 |
| 590513 | 2/1978 | U.S.S.R. | 252/12.2 |

*Primary Examiner*—Michael L. Lewis
*Attorney, Agent, or Firm*—Karl W. Flocks

[57] ABSTRACT

A composite bearing material has a porous metallic layer integrally formed on the surface of a metallic backing, the pores and surfaces of the porous metallic layer being impregnated with a mixed bearing material of 0.1–15% fibrous material having good affinity for oil, 1–15% lubricating oil and the remainder synthetic resin. This composite bearing material is improved in its bearing properties such as load carrying capacity, wear resistance, non-stick properties and dimensional stability.

11 Claims, 1 Drawing Figure

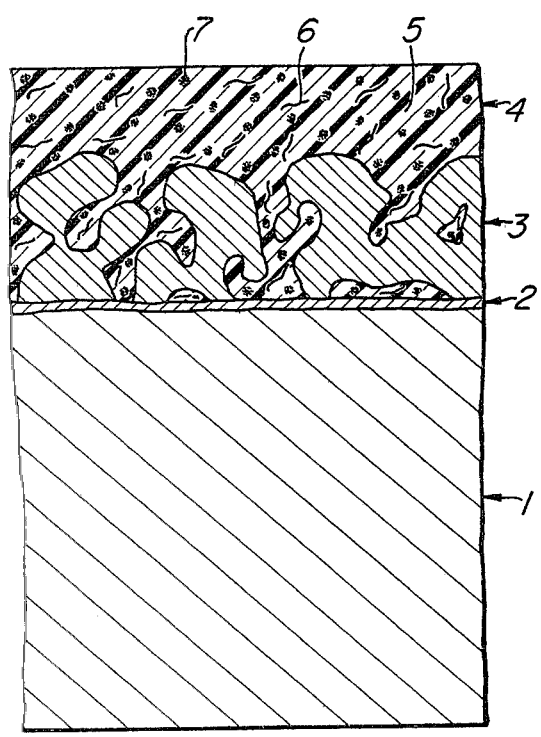

COMPOSITE BEARING MATERIAL WITH METALLIC BACKING

This is a continuation of application Ser. No. 876,809, filed Feb. 10, 1978, now abandoned.

The present invention relates to a composite bearing material comprising a metallic backing.

The inventors, prior to the present invention, had studied and developed a bearing material made of synthetic resin containing a fibrous material having a good oil affinity and filed an application for a patent under Japanese Patent Application No. 89575/73 (Japanese Patent Application Kokai (Laid-Open) No. 38748/75.) Briefly, the bearing material under the Japanese application consists of the following:

(1) a bearing material consisting of 0.1-15% by weight of fibrous material having a good affinity for oil, 1-15% by weight of lubricating oil and the remainder being polyacetal, (2) a bearing material consisting of 0.1-15% by weight of fibrous material having a good affinity for oil, 1-15% by weight of lubricating oil, 0.1-10% by weight of metallic soap, and the remainder being polyacetal, (3) a bearing material consisting of 0.1-15% by weight of fibrous material having a good affinity for oil, 0.1-10% by weight of metallic soap, 0.1-10% by weight of solid lubricant and the remainder of polyacetal, (4) a bearing material consisting of 0.1-15% by weight of fibrous material having a good affinity for oil, 1-15% by weight of lubricating oil, 0.1-10% by weight of solid lubricant and the remainder of polyacetal. The bearing material under said Japanese Patent Application, however, still has a drawback in that it is not strong enough in its mechanical strength with respect to its load carrying capacity and not good enough in its heat conductivity when used as a bearing for an industrial machines, a railway vehicle or a bridge wherein it is required to work under severe conditions.

There also are known several kinds of composite bearing materials with metal backing. One example is a composite bearing marterial made by impregnating and coating the pores and surfaces of a porous metallic layer provided on a metallic backing with mixture consisting of polytetrafluoroethylene as a base and containing a combination of two or more ingredients selected from a metal, a metallic compound, and a solid lubricant or all of them as fillers. Such composite bearing materials (hereinafter referred to as "conventional composite bearing materials A") are shown in Japanese Patent Publications No. 16950/64, No. 18474/67 and No. 29395/72. Another example known is a one made by impregnating the pores and surfaces of the porous metallic layer on the metallic backing with a resin containing no oil and then coating the surfaces with a resin containing oil (as shown, for example, in Japanese Patent Publication No. 44597/74, hereinafter referred to as "conventional composite bearing material B".)

However, the conventional material A is entirely unsuitable for making bearings for industrial machines or apparatus that must work at high speeds, as it does not contain lubrication oil. The conventional material B, on the other hand, contains lubricating oil only in the coating resin so that the loss of the surface layer of the oil containing resin has resulted in the loss of the lubricating effect and has become a cause for sticking.

An object of the present invention is to eliminate the drawbacks of the bearing material related to said earlier application in Japan by the present inventors and to improve the mechanical strength and heat conductivity of said earlier invention by greatly improving the bearing properties such as load carrying capacity, wear resistance, non-stick properties and dimensional stability (dimensional accuracy).

Another object of the present invention is to eliminate the drawbacks of the conventional materials A and B and to add a fibrous material with oil-affinity having a special effect to the impregnating and coating compounds so that the lubricating oil may easily sweat from the bearing surfaces due to the generated frictional heat and load, thereby offering a bearing suitable for high speed running.

The present invention has greatly improved the bearing properties such as load carrying capacity, wear resistance, non-stick performance heat conductivity and dimensional stability by forming the bearing material of the inventor's earlier invention of the applications in Japan into a sheet, for instance, and impregnating the pores and surfaces of the porous metallic layer formed on a metallic backing such as steel backing with said formed bearing material.

Attached drawing is a partial enlarged cross-sectional view illustrating the structure of a composite bearing material, of this invention, namely an embodiment in accordance with the present invention.

The embodiments in accordance with the present invention will now be explained by comparing them with the bearing materials disclosed in the above-mentioned earlier patent application in Japan and with the conventional materials A and B.

Table 1 shown later indicates the testing conditions under which the examples 1 through 11 explained below were tested. Table 2 shows the bearing properties, bearing structures and uses for the bearing materials described in Examples 1 through 11.

EXAMPLE 1

A bearing material of the prior invention under the inventor's earlier patent application in Japan 90% by weight of polyacetal (Brand name: Duracon M 90), 7% by weight of lubrication oil (SAE 30 Engine oil) and 3% by weight of fiber with an affinity for oil (Brand name: Permawick, see U.S. Pat. No. 2,966,459 and—Japanese Patent Publication No. 8733/60) were mixed and this mixture was put in a pot made of aluminum foil and heated for 30 minutes at a temperature of 200° C. (which is above the melting temperature of said plastic), and then left to cool. The solidified compound was pelletized with a crusher and injection-molded to produce a 50 mm dia×7 mm thick disc-shaped single piece sample bearing for testing. The bearing properties of this sample bearing were as shown in Table 2.

EXAMPLE 2

A bearing material in accordance with the prior invention under the earlier patent application in Japan With 88% by weight of the above-mentioned plastics, 3% by weight of said fiber, 8% by weight of said lubricating oil and 1% by weight of zinc stearate, a similar test sample was obtained in the same way as for Example 1. The bearing properties of this sample piece are as shown in Table 2.

EXAMPLE 3

A bearing material of the prior invention under the earlier patent application in Japan A test sample was obtained in the same way as described in Example 1 using 87% by weight of said plastics, 3% by weight of said fiber, 8% by weight of said lubricating oil, 1% by weight of lithium stearate and 1% by weight of graphite. The bearing properties of this test sample are as shown in Table 2.

EXAMPLE 4

A bearing material of the invention under the earlier application in Japan

A test sample having the bearing properties as shown in Table 2 was obtained in the same way as described in Example 1, using 88% by weight of said plastics, 3% by weight of said fiber, 8% by weight of lithium stearate and 1% by weight of graphite.

EXAMPLE 5

An embodiment of the present invention

Each ingredient as shown in Samples 1 through 4 was mixed with a melting and kneading machine (Banbury kneader) and the molten mixture was rolled to produce a sheet. Bronze powders were then sintered onto the surface of the copper plated steel backing to form a porous layer. The porous metallic layer with backing metal thus prepared was heated to a temperature above the melting point of said plastics and one of the plastics sheets was superimposed on the surface of the porous metallic layer and passed through rollers together with the steel backing to form the pores and surfaces of the porous bronze layer impregnated and coated with the plastics, thus a multi-layer bearing material for testing was obtained. The bearing properties of this bearing are shown in Table 2.

EXAMPLE 6

An embodiment of this invention

Each bearing ingredient as described in Examples 1 through 4 was mixed by a mixer (Henshel mixer) and the mixed powders were laid on a porous metallic layer on a steel plate and passed through a furnace heated to a temperature above the melting point of the plastic contained therein and then rolled into a sheet. Then, test samples were made in the same way as described in Sample 5. The bearing properties of the bearings are as shown in Table 2.

EXAMPLE 7

An embodiment of this invention

Each of the ingredients corresponding to those of Examples 1 through 4 was melted and mixed using a Banbury mixer and the molten mixture was pelletized with a crusher or pelletizer. Then, the pellets were formed into a sheet using an extruder. Using this sheet, a test bearing having bearing properties as shown in Table 2 was made in the same way as shown in Sample 5.

EXAMPLE 8

An embodiment of this invention

Each of the ingredients the same as those used in Samples 1 through 4 was melted and mixed with a Banbury mixer. The molten mixture was crushed into powder of 20 mesh or smaller size. This powder was next laid on the surface of said porous bronze layer with a steel backing and heated to a temperature above the melting point of said plastics and then passed under a roller to force the plastic to fill the pores and coat the surfaces of said porous bronze layer. A multi-layer bearing thus obtained has the bearing properties as shown in Table 2.

EXAMPLE 9

An embodiment of this invention

Each of the ingredients as described in Examples 1 through 4 was mixed with a Henshel mixer and the mixed powders were laid over the surface of said porous bronze layer with a steel backing then heated to a temperature exceeding the melting point of said plastics and compacted between rollers to force the plastic to fill the pores and coat the surfaces of said porous bronze layer. A multi-layer sample bearing thus obtained showed the test results as shown in Table 2 in the test as described in Table 1.

EXAMPLE 10

Conventional sample bearing A

A porous bronze layer was provided on a copper plated steel backing and on this porous bronze layer, a viscous mixture consisting of 20% by volume of Pb and the remainder being polytetrafluoroethylene (P.T.F.E) laid. This was passed between a pair of rollers to make the pores in said layer impregnated and the surfaces of said layer coated with the mixture. After this process, the material was baked at a temperature above the melting point of the P.T.F.E and then passed between the rollers to produce a composite multi-layer bearing for comparison test. The bearing thus obtained showed the results as shown in Table 2.

EXAMPLE 11

Conventional sample bearing B

A porous bronze layer provided on a copper plated steel backing was first impregnated with polyacetal and then the surface of said layer was coated with polyacetal containing 8% by weight of lubricating oil. This was then heated to a temperature above the melting point of the polyacetal resin and passed between the rollers to produce a composite multi-layer bearing for the testing purpose. This bearing showed the results as shown in Table 2.

It is to be understood that other copper alloys can be used instead of bronze for making said porous metallic layers of the embodiments of this invention shown as Examples 5 through 9.

It should be also noted that the melting and mixing machines to be used are not limited to Banbury mixers and Henshel mixers used here but any other suitable melting and mixing machines can be used instead.

It is also apparent that the impregnating and coating process made here by using rollers can also be made by using other machines such as conventional press.

TABLE 1

| | Test conditions | | | |
|---|---|---|---|---|
| | Load kg/cm$^2$ | Speed m/min. | Time Hr. | Lubrication |
| Examples 1-11 | 5-50 | 18-120 | 2 | Dry |

Note:
Testing Machine: Thrust type friction and abrasion tester

TABLE 2

| Test Samples | Sample No. | Test results | | Bearing structure | Uses |
|---|---|---|---|---|---|
| | | Bearing properties | | | |
| | | Coefficient of friction | Wear amount (mm) | | |
| Bearing materials related to earlier applications in Japan | 1 ƒ 4 | 0.06-0.14 | 2-10 | Single layer bearing | High speed, light load use |
| Embodiments of the present invention | 5 ƒ 9 | 0.07-0.14 | Upto 1 | Multi-layer bearing | High speed heavy load use |
| Conventional materials  A | 10 | 0.11-0.20 | 9-15 | Multi-layer bearing | Low speed heavy load use |
| B | 11 | 0.12-0.20 | Upto 1 | Multi-layer bearing | High speed heavy load use |

It can be noted from Table 2 that the embodiments of the present invention show a coefficient of friction substantially the same as that of the bearing materials related to the earlier patent application in Japan but the former's wear amount is much less than that of the latter. When compared with the conventional composite bearing material A, the embodiments of the present invention are considerably improved both in coefficient of friction and in wear resistance, the extent of improvement is very large. The inventors have also confirmed that the embodiments of this invention wherein steel backings are provided are remarkably improved in load carrying capacity, wear resistance, heat conductivity, non-stick quality and dimensional stability (dimensional accuracy) as compared with the bearing materials related to the earlier patent applications in Japan. That is, the embodiments in accordance with this invention have been found to have a marked effect that they can be used at high PV values (a PV value is the product of a load P and a frictional speed V). Also the embodiments of this invention have been found to be free of galling even in a long use at high speeds, because of containing fiber with oil affinity which has an excellent lubrication effect. Therefore, they can fully withstand such uses that the conventional materials cannot withstand.

Next, we will explain the reasons for specifying the numerical limitation on each content of the bearing materials of this invention with metal backing.

(1) A fiber having a good affinity for oil:
0.1-15% by weight and length of 3 mm max.
a. When the fiber content exceeds 15%, it impairs formability and when its content is less than 0.1% the supply of lubricating oil to the slide surface becomes too small to attain satisfactory effect.
b. A suitable fiber having a good affinity for oil is a material that not only absorbs oil but also retains it and prevents it from seeping away. A good example is a wooden (organic) cellulose fiber disclosed in Japanese Patent Publication No. 8733/70 (brand name: Permawick) which has a good affinity for oil. It goes without saying, however, that this is not the only material which may be used and that any other suitable fibers may also be used. From a viewpoint of formability and lubrication, the length of fiber should preferably be less than 3 mm.

(2) Lubricating oil:
1-15% by weight.
When content of the lubricating oil exceeds 15%, it becomes difficult to form the resin. With less than 0.1% lubricating oil, the amount supplied to the sliding surface will be too little to produce a satisfactory effect. Mineral oil, other than engine oil, and synthesized oil may be used as the lubricating oil for this purpose.

(3) Solid lubricant:
0.1-10% by weight.
If the solid lubricant is added in excess of 10%, it degrades the mechanical strength. With less than 0.1%, little improvement can be expected in load carrying capacity and formability. But, depending on the uses, this may be omitted. The addition of solid lubricant has another object. That is, it can be used as a coloring agent to improve the product's look as a commercial product. Incidentally, carbon black can, of course, be used as a colorant.

(4) Metallic soap:
0.1-10% by weight
The addition of metallic soap in excess of 10% degrades the mechanical strength of the bearing material. With less than 0.1% metallic soap, dispersion of the lubricating oil, bearing properties and formability by injection moulding will be lowered. According to an experimental test, however, injection molding even without metallic soap was also possible and the bearing properties were quite good also. Therefore, this may be omitted depending on the uses. By the metallic soap in this invention are meant zinc stearate, lithium stearate and lead naphthenate and so on.

(5) Synthetic resin
Thermoplastic resins such as polyacetal and polyamide can be used as a suitable material for this invention but there is no reason that they should be limited to these resins. Other synthetic resins may also be used, of course.

The attached drawing is a partial enlarged cross-sectional view of a bearing material, i.e., an embodiment of the present invention, in which numeral 1 is a metallic backing layer made, for instance, of steel. 2 is a layer of plating with copper, nickel or other metals. 3 is a porous metallic layer formed on the surface of the copper plating 2. 4 is a surface layer and 5 is a plastic base such as polyacetal and other resins. 6 is one of the fibers with oil affinity (an oil-retaining agent soaked with lubrication oil) dispersed in the base 5. 7 are lubricating oil droplets dispersed in said base 5.

Incidentally, the plated layer 2 is provided for attaining stronger bonding. If there are some other suitable means such as an appropriate pre-treatment, etc. for attaining a tight adhesion, the metal plating may, of course, be dispensed with.

A composite bearing material comprising a metallic backing in accordance with this invention exhibits such excellent bearing properties as described above because of the following reasons:

(1) A porous metallic layer with a metallic backing is provided.

(2) A fibrous material having a good affinity for oil is contained in the impregnating and coating mixture.

A porous metallic layer with a metallic backing serves to retain the impregnated and coated resin firmly and to conduct and dissipate the frictional heat generated during the use. A fiber with oil affinity has a function of enabling an excellent lubrication and preventing sticking through its unique oil lubrication effect (upon rotation of the shaft, the oil will easily sweat out because of the frictional heat, and upon stopping of the shaft, the oil will be reabsorbed and stored by the oil-liking fiber), thus rendering the bearing material suitable for high speed use.

As described above, a bearing material comprising a metallic backing in accordance with the present invention is made by adding a metallic backing to the single-layer bearing material already disclosed in the above-mentioned earlier patent application in Japan to increase the mechanical strength and heat conductivity of the single-layer bearing material, thereby improving bearing properties such as load carrying capacity, wear resistance, non-stick quality and dimensional stability. This invention also brings about a great improvement over the well-known bearing materials with metal backing (the conventional materials A and B) with respect to the coefficient of friction and wear resistance realized by adding a special oil affinity fiber.

I claim:

1. A composite bearing material with metal backing having superior load carrying capacity, wear resistance and non-stick properties, and comprising a metallic backing, a porous metallic layer provided on the surface of said metallic backing, and a bearing material mixture impregnating and coating the pores and surfaces of said porous metallic layer, said bearing material consisting essentially of 0.1-15% by weight of fiber material having a good affinity for oil, 1-15% by weight of lubricating oil and the remainder being synthetic resin.

2. A composite bearing material with metal backing claimed in claim 1, wherein said material further contains 0.1-10% by weight of metallic soap.

3. A bearing material with metal backing as claimed in claim 1, wherein said bearing material further contains 0.1-10% by weight of solid lubricant.

4. A bearing material with metal backing as claimed in claim 2, wherein said bearing material further contains 0.1-10% by weight of solid lubricant.

5. A bearing material in accordance with claim 4 wherein said metallic backing is steel, said porous metallic layer is bronze, said synthetic resin is polyamide or polyacetal, and wherein a plating layer of copper or nickel is interposed between said metallic backing and said porous metallic layer.

6. A bearing material in accordance with claim 1 wherein said fiber material having a good affinity for oil consists essentially of fibers having a maximum length of 3 mm.

7. A bearing material in accordance with claim 6 wherein said fiber material having a good affinity for oil comprises cellulose fiber.

8. A bearing material in accordance with claim 7 wherein said cellulose fiber is "Permawick".

9. A composite bearing material in accordance with claim 1 further comprising a plating layer between said metallic backing and said porous metallic layer.

10. In a composite bearing material having a metal backing, a porous metallic layer provided on the surface of said metallic bearing and a bearing material mixture impregnated and coating the pores and surfaces of said porous metallic layer, said bearing material including lubricating oil and synthetic resin, the improvement wherein said bearing material includes means to increase wear resistance comprising 0.1-15% by weight of fiber material having a good affinity for oil, said lubricating oil being present in an amount of 1-15% by weight and the remainder of said bearing material being said synthetic resin.

11. A bearing material in accordance with claim 10 wherein said fiber material is present in an amount of approximately 3%.

* * * * *